R. RICHTER.
ALTERNATE CURRENT COMMUTATOR MOTOR.
APPLICATION FILED JAN. 15, 1907.
962,101.
Patented June 21, 1910.
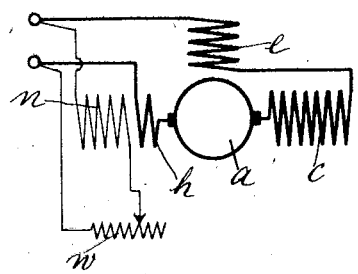
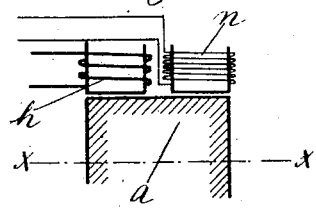
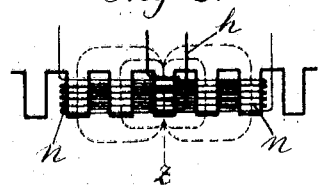
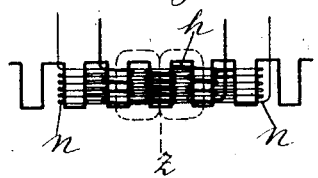
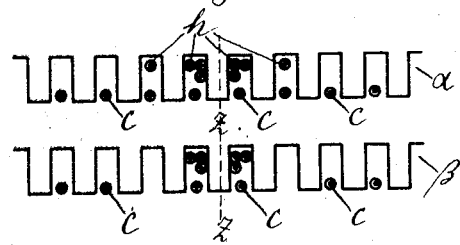
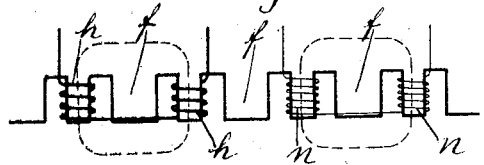
Witnesses:
H. A. Jauke
L. Flynn
Inventor:
Rudolf Richter
by Knight Bros.
Attorneys

UNITED STATES PATENT OFFICE.

RUDOLF RICHTER, OF CHARLOTTENBURG, GERMANY, ASSIGNOR TO SIEMENS-SCHUCK-ERTWERKE G. M. B. H., OF BERLIN, GERMANY, A GERMAN CORPORATION.

ALTERNATE-CURRENT COMMUTATOR-MOTOR.

962,101.  Specification of Letters Patent.  Patented June 21, 1910.

Application filed January 15, 1907. Serial No. 352,390.

*To all whom it may concern:*

Be it known that I, RUDOLF RICHTER, a subject of the German Emperor, residing at Eosanderstrasse 11, Charlottenburg, near Berlin, Germany, have invented certain new and useful Improvements in Alternate-Current Commutator-Motors, of which the following is a specification.

The present invention relates to alternate current commutator motors with series auxiliary windings and shunt auxiliary windings for canceling the reactance tensions and transformer tensions which arise in the coils which are at any time short-circuited by the brushes, and an important object is to provide two auxiliary windings which are simultaneously operative and so arranged that they reciprocally influence one another as little as possible.

In the coils of alternate current commutator motors which are at any time short-circuited by the brushes, one tension arises in consequence of the alternating exciting field which passes through the armature and a second tension arises owing to the current in the armature in the same manner as in the case of continuous current motors, namely a reactance tension. The former tension will be referred to in the following description for the sake of brevity as "transformer tension." Both these tensions are displaced relatively to one another 1/4 period as is known. If, therefore, special commutating auxiliary windings or commutating auxiliary poles are arranged, by which auxiliary fields are produced at suitable places in the armature, the reactance tension only can be overcome by a field varying with the armature current which may be produced by a series auxiliary winding, whereas a shunt connection of an auxiliary winding is suitable for overcoming the transformer tension. The simplest arrangement would be to wind a series auxiliary winding and a shunt auxiliary on a common reversing pole, but such an arrangement would only have a limited effect for the following reasons. The two windings are inductively connected as in a transformer, and as the field in one coil is determined as to strength and phase by the tension at the terminals of the same, the resulting field in the shunt winding of the auxiliary pole is always maintained at the same value and in the same phase so that it can satisfy the conditions for only one certain strength of armature current.

Means will now be described which, in accordance with the present invention, have the object of neutralizing in large measure the reciprocal influence of the two auxiliary windings, so that they are both actually effective in the manner intended.

In order that the invention may be more clearly understood reference is made to the accompanying drawing in which various arrangements of windings in accordance with the present invention are shown diagrammatically, by way of example, and in which—

Figure 1 shows the series and shunt auxiliary windings on the same pole; Fig. 2 shows the series and shunt auxiliary windings on separate adjacent poles; and Figs. 3, 4, 5 and 6 are developments of poles with the series and shunt auxiliary windings wound thereon in various arrangements.

In Fig. 1 $a$ denotes the armature of an alternate current commutator motor, $e$ the main exciting winding, $c$ the compensation winding, $h$ the series auxiliary winding and $n$ the shunt auxiliary winding. The windings $h$ and $n$ are here thought of as being on one reversing pole, but in the shunt winding $n$ a non-inductive or inductive resistance $w$ is inserted in order to increase the drop in potential of the shunt circuit, or in order to make its resistance so great that the current induced by the series winding $h$ in the shunt winding is small. Consequently the strength of current in the shunt winding is influenced but little by the main current so that the conditions of the independent action of the two windings to be fulfilled can thus be met in a more or less high degree.

The arrangements in accordance with the present invention hereafter described are more effective for the object in view. The most simple form of them is represented in Fig. 2 where $a$ denotes a longitudinal section of the armature having the axis $x$—$x$; the two windings $h$ and $n$ are connected with the armature in series and shunt respectively and are mounted one beside the other in the direction of the axis of the motor on separate auxiliary poles.

In the arrangement shown in Fig. 3 a plurality of the teeth of the stator are employed for the auxiliary windings. The representation in the figure shows a development of a part of the stator. The shunt winding is placed around five teeth, in the center of which the series winding $h$ is arranged around one tooth at the place of reversal $z$. As the paths of the lines of force produced by the series winding are closed by the other four teeth inclosed by the shunt winding, the latter will therefore be influenced only little by the series winding.

Fig. 4 shows an arrangement by which that shown in Fig. 3 can be made still more efficient. In this case the teeth adjacent to the central tooth are included within the sphere of action of the series winding, the direction of the winding being such that the central tooth forms the common opposite pole to the like poles adjacent to it. It is evident that when the winding is correctly proportioned none of the lines of force generated by the main current pass through the shunt winding $n$; thus the two windings will be entirely independent of one another. The series winding may also be on four teeth instead of on three, in which case the two inner teeth would be excited in one direction and two outer in the opposite direction.

In Fig. 5 the series winding $h$ is shown arranged at the bottom of the slots, whereas the remaining compensation winding $c$ for neutralizing the armature field is placed at the top in the slots. As is seen in the upper row of slots $a$ the conductors $h$ and $c$ in the second slots right and left of the neutral zone $z$ have currents in them of opposite direction. These conductors in these slots may therefore be omitted, as shown in the lower row of slots $\beta$. These vacant slots therefore allow of the shunt auxiliary winding being more easily arranged.

In the arrangements of the windings according to Figs. 3, 4 and 5 it is clearly essential that the shunt windings surround the series windings.

In the case of multi-polar machines separate magnetic circuits may be made for the series auxiliary winding and shunt auxiliary winding, as Fig. 6 indicates, by arranging the auxiliary poles at different places of the periphery of the armature, so that they act simultaneously on different sides of the short-circuited coil. In this figure the main poles of the machine $f, f$ have each got an auxiliary pole between them. Each pair of these auxiliary poles carry alternately one of the windings $h$ and $n$.

What I claim as my invention and desire to secure by Letters Patent is:

1. An alternating current commutator motor having an armature and a grooved stator, and having auxiliary windings in series and in shunt to the armature to neutralize the reactance and transformer tensions in the short circuited coils of the armature, said two auxiliary windings being disposed in different grooves of the stator, one of the auxiliary windings within the other.

2. An alternating current commutator motor having an armature and a grooved stator, and having auxiliary windings in series and in shunt to the armature to neutralize the reactance and transformer tensions in the short circuited coils of the armature, said two auxiliary windings being disposed in different grooves of the stator, the series auxiliary windings disposed within the coils of the shunt auxiliary windings.

In testimony whereof I have signed my name to this specification in the presence of the two subscribing witnesses.

RUDOLF RICHTER.

Witnesses:
HENRY HASPER,
WOLDEMAR HAUPT.